Feb. 7, 1950     J. C. TRAVILLA, JR     2,496,644
RAILWAY TRUCK WITH LATERAL MOTION BOLSTER

Filed March 6, 1948

INVENTOR
JAMES C. TRAVILLA, JR.
BY Rodney Bedell
ATTORNEY.

Patented Feb. 7, 1950

2,496,644

UNITED STATES PATENT OFFICE 2,496,644

RAILWAY TRUCK WITH LATERAL MOTION BOLSTER

James C. Travilla, Jr., University City, Mo., assignor to General Steel Castings Corporation, Granite City, Ill., a corporation of Delaware Application March 6, 1948, Serial No. 13,428

8 Claims. (Cl. 105—185)

The invention relates to railway trucks and particularly to the type having a separate bolster supported from the truck frame with provision for some lateral movement of the bolster relative to the truck frame.

The invention is adapted to four-wheel or six-wheel trucks where springs supporting the truck frame on the wheels and axles will offer sufficient spring action as distinguished from trucks for vehicles which include a spring support between the truck frame and bolster in addition to the spring support between the truck frame and the wheels and axles.

Trucks including separate bolsters, which are non-spring supported from the truck frame but have lateral movement relative to the truck frame, have been made previously with the bolster supported from the truck frame either by swing hangers or by rocker or roller centering devices, but some trouble has been experienced with such arrangements in controlling the lateral movement and they have been found to be heavier and more expensive than the proposed arrangement.

The main object of the present invention is to provide for relative lateral movement of the truck frame and bolster by means, other than those described briefly above, which will also snub or damp such relative movement and, at the same time, will center the bolster in the frame transversely of the truck and cushion vertical shocks between the bolster and truck frame.

Another object is to control lateral bolster movement and cushion vertical shocks, yet make the truck lighter and its wheel bases shorter than corresponding swing hanger type trucks by simplifying the structure which controls the bolster movement and by utilizing the space normally occupied by the bolster swing hangers for the brake hangers.

Another object is to reduce first cost and maintenance costs below those experienced with rockers, rollers or swing hangers.

These and other objects are accomplished by recessing the bolster angularly at each side to extend over and alongside the adjacent transom, thereby forming opposing substantially horizontal and vertical faces on the bolster and transoms. A horizontally disposed pad of rubber or rubber-like material is disposed between the horizontal opposing faces of the bolster and transoms and cushions the vertical load and distorts in shear to provide for relative movement of the bolster and transoms transversely of the truck. The vertical face, at least at one side of the bolster, is urged by suitable means into engagement with the opposing vertical face of the associated transom to snub or damp movement of the bolster laterally of the truck.

The above and other detail objects as will appear below are attained by the structure described in the accompanying drawings in which—

Figure 1:
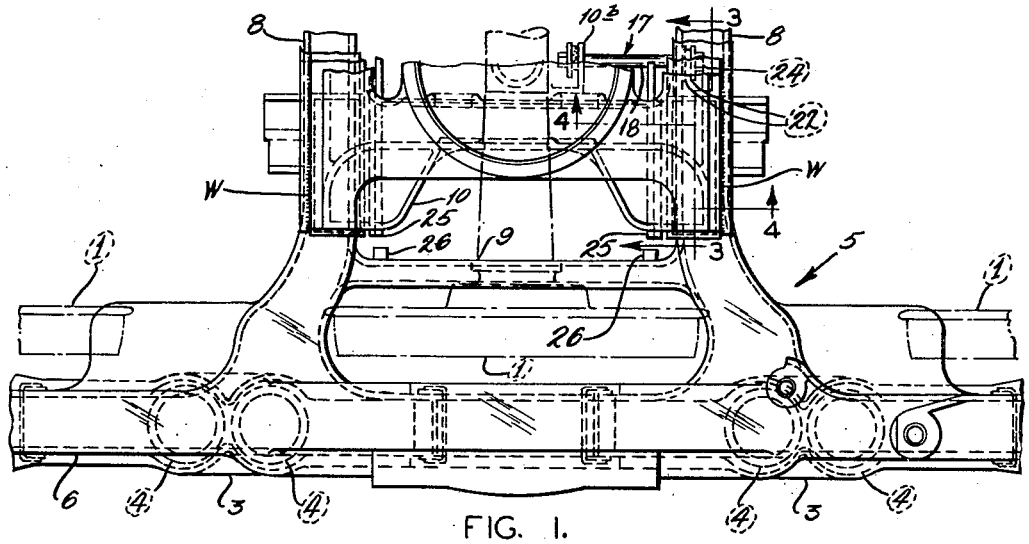
Figure 1 is a top view of a longitudinal half of the center portion of a railway truck constructed according to the invention.
Figure 2:
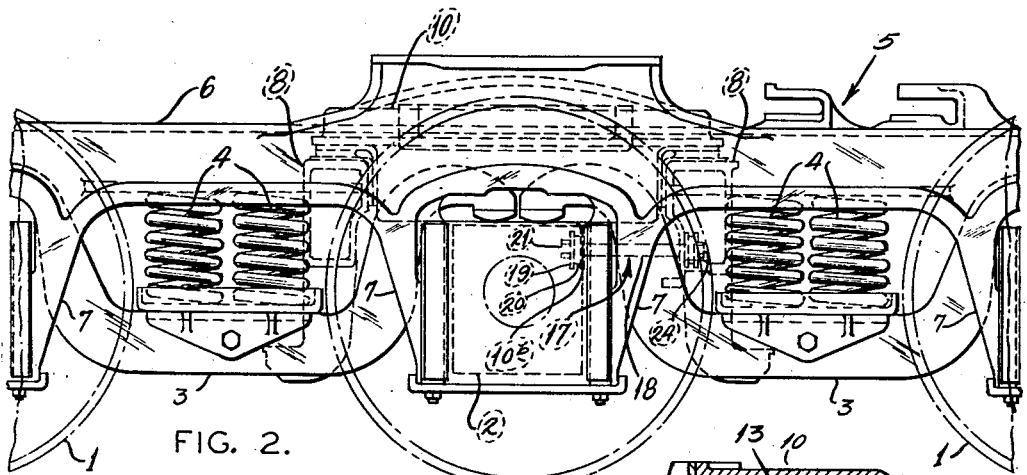
Figure 2 is a part side view of the truck.
Figures 3, 4:
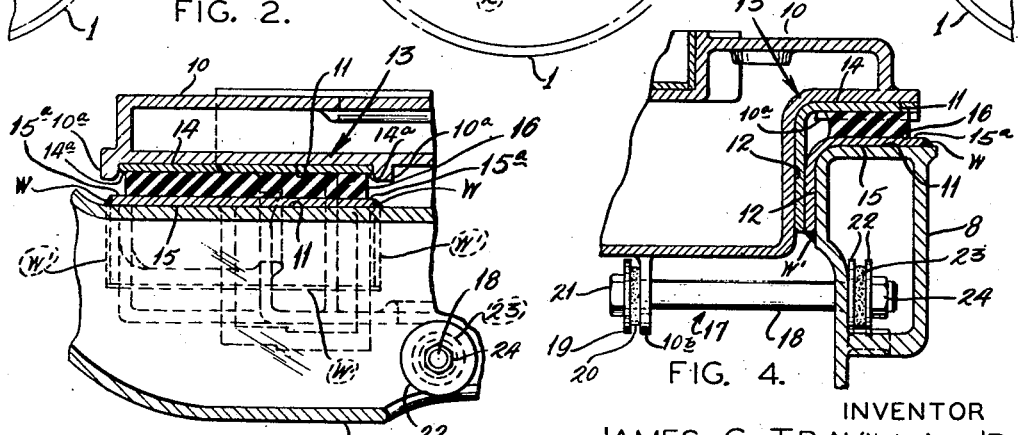

Figures 3 and 4 are vertical sections through a transom and pad assembly taken at right angles to one another approximately on the lines 3—3 and 4—4, respectively, of Figure 1.

The six-wheel railway truck shown in the drawings comprises the usual wheel and axle assemblies 1, journal boxes 2, longitudinal equalizers 3 carried on the boxes, equalizer springs 4, a truck frame 5 preferably consisting of a one-piece casting including wheel pieces 6 with depending pedestal legs 7 receiving journal boxes 2 between them, transverse spaced transoms 8 and braces 9 between the transoms.

A bolster 10 is supported on and extends between transoms 8. Bolster 10 has its lower portions recessed angularly at each side adjacent transoms 8. Transoms 8 and the recessed portions of bolster 10 present substantially parallel horizontal and vertical opposing faces 11 and 12.

Yielding assemblies 13 mount the bolster on the transoms and are positioned between faces 11 and 12 substantially at the corners of bolster 10 to provide a stable support for the bolster and its load. Each yielding assembly comprises a pair of angular steel plates 14 and 15 secured to associated horizontal and vertical faces of the bolster and transoms. A pad 16 of rubber or rubber-like material is positioned between and bonded to horizontal portions of plates 14 and 15 and the vertical faces of plates 14 and 15 oppose one another. The width of bolster 10 between vertical faces 12 and the spacing of transoms 8 provides a sliding fit between the opposing vertical faces of plates 14 and 15.

The horizontal portion of each steel plate 14 extends longitudinally of the bolster beyond yieldable pad 16 and its extensions 14a are fitted between lugs 10a on the bolster to position plate 14 relative to the bolster. The horizontal portion of each steel plate 15 extends laterally and longitudinally of the associated transom 8 beyond yieldable pad 16 and its extension 16a is welded to the horizontal face of the transom as indicated at W. The sides and lower end of the vertical portion of each plate 15 are welded to the vertical face of the associated transom at W'. If desired, steel plates 15 may be retained in place on the truck frame transoms by shear lugs, such as 10a on the bolster. Pads 16 are compressed between the bolster and transoms and cushion the vertical load without providing for substantial vertical movement.

A tie bar 17 extends longitudinally of the track substantially along its center line and is connected at one end to a depending bracket 10b on bolster 10 and at its other end to one of the transoms and urges the opposing vertical faces of plates 14 and 15 at one side of the bolster into engagement with one another. Tie bar 17 is long enough to yield laterally and permits bolster 10 to move transversely of the truck relative to the truck frame.

The tie bar may comprise an elongated bolt 18 extending through aligned openings in bracket 10b and in the associated transom. A steel washer 19 and a rubber washer 20 are mounted on bolt 18 between its head 21 and bracket 10b. A pair of steel washers 22 and a rubber washer 23 therebetween are mounted on the opposite end of the bolt between nut 24 and the transom wall. Nut 24 is drawn tight enough to urge opposing faces of adjacent plates 14 and 15 into engagement with one another.

Pads 16 yield to shearing forces applied transversely of the truck and accommodate relative movement of the bolster and frame transversely of the truck. The resistance of the pads to distortion in shear and the engagement of the vertical faces of plates 14 and 15 at one side of the bolster snub or damp such relative movement of the bolster and frame. The pads also tend to center the bolster in the truck frame laterally of the truck when the lateral forces are spent. Thus the structure lessens the effect of shocks due to track irregularities, curves and other causes tending to move the wheel and axle assemblies relative to the journal boxes.

Stops 25 on bolster 10 oppose stops 26 on braces 9 and limit relative movement of the bolster and frame transversely of the truck. The opposing vertical faces of plates 14 and 15 limit relative movement of the bolster and frame longitudinally of the truck.

With this arrangement, lateral motion of the bolster is dampened and resonant lateral oscillations of the bolster are prevented by the yieldable pads and by engagement of the associated plates on the bolster and transom. By placing the yielding assemblies at the four corners of the bolster, they provide a stable support for the bolster and its load.

The structure described controls movement of the bolster transversely of the truck and cushions its vertical movement and may be used on either four or six-wheel trucks. The lightness, simplicity and compactness of the structure makes it possible to construct the trucks lighter and shorter than corresponding swing hanger type trucks because the space normally occupied by the swing hangers may be used for the brake parts, particularly the brake beam and brake heads.

The details of construction may be varied substantially without departing from the spirit of the invention and the exclusive use of those modifications coming within the scope of the claims is contemplated.

What is claimed is:

1. In a railway truck, a frame including spaced transoms, a bolster supported by and extending between said transoms, said bolster having horizontal and vertical faces, flat yieldable pads positioned between and secured to horizontal opposing faces of said bolster and transoms and distorting in shear to provide for relative movement of said bolster and frame transversely of the truck, the vertical face of one side of said bolster engaging the opposing vertical face of the associated transom to snub relative movement of said bolster and frame transversely of the truck.

2. In a railway truck, spaced transoms, a bolster with substantially horizontal portions extending over and substantially vertical portions extending abreast of associated portions of said transoms, wide flat yieldable pads positioned between adjacent horizontal portions of said bolster and transoms and providing for relative movement of said bolster and transoms transversely of the truck, and a device for urging the vertical portion at one side of said bolster into engagement with the vertical portion on the associated transom to snub relative movement of said bolster and said transoms laterally of the truck.

3. Structure as described in claim 2 in which the device includes a tie bar yieldingly secured at one end to the bolster and at its opposite end to a transom and which accommodates relative movement of the bolster and transoms transversely of the truck.

4. In a railway truck, a frame having spaced transoms, a bolster supported by and extending between said transoms, said bolster and said transoms presenting opposing substantially wide horizontal and vertical faces, yieldable assemblies providing for relative movement of said bolster and transoms transversely of the truck, each assembly comprising a pair of angular metal plates attached to the opposing faces of said transoms and bolster, respectively, and a rubber pad fastened to and positioned between the horizontal portions of said plates, the vertical portions of said plates at least at one side of the bolster and the associated transom engaging each other to snub relative movement of the bolster and frame transversely of the truck.

5. Structure as defined in claim 4 including a tie bar urging the plates at one side of the bolster and on the associated transom into engagement with one another.

6. In a railway truck, a frame including spaced transom members, a bolster member supported by and extending between said transom members, said bolster member and said transoms presenting opposing substantially wide horizontal and vertical faces, yieldable pads positioned between horizontal opposing faces of said bolster member and transom members and distorting in shear to provide for relative movement of said bolster member and frame transversely of the truck, a yielding tie bar urging the vertical face of one side of said bolster member into engagement with the opposing vertical face of the associated transom member to snub relative movement of said bolster member and frame transversely of the truck, said tie bar including a bolt passing through said bolster and one of said transom members and having a head on one end and a nut on its other end, there being washers of rubber-like material on said bolt between the bolt head and nut and said members respectively.

7. In a railway truck, spaced frame transoms each extending transversely of the truck and having upwardly and laterally disposed surfaces merging in an angular formation, a bolster with its lower portion recessed angularly at each side to extend over and alongside the adjacent transom angular formation, an angular device fitting between each transom and the adjacent bolster recess and comprising an L-shaped plate secured to a transom angular formation and an L-shaped plate secured in the associated bolster recess, there being a flat pad of rubber-like material between the laterally disposed portions of said plates and subjected to initial compression thereby to cushion vertical load, said plates being bonded to opposite sides of said pad and distorting same under shear to yieldingly accommodate relative movement of the transoms and bolster transversely of the truck, the vertically disposed surfaces of the plates at least at one side of the bolster normally engaging one another to snub lateral movement of the bolster transversely of the truck.

8. A railway truck bolster mounting device comprising a pair of L-shaped plates and a rubber pad positioned between said plates and bonded to one leg of each plate, and the other legs of said plates frictionally engaging one another, said pad being adapted to distort in shear and said last mentioned legs sliding over one another when forces are applied in opposite directions to said plates and parallel to the planes of said last mentioned legs, one of said plates being shaped for application to the top face and side face of a truck frame transom and the other plate being shaped for application to the underside of a truck bolster.

JAMES C. TRAVILLA, JR.

REFERENCES CITED

The following references are of record in the file of this patent:

UNITED STATES PATENTS

| Number | Name | Date |
| --- | --- | --- |
| 2,061,767 | Hobson | Nov. 24, 1936 |
| 2,076,071 | De Bolt | Apr. 6, 1937 |
| 2,138,175 | Keys | Nov. 29, 1938 |
| 2,264,701 | Latshaw | Dec. 2, 1941 |
| 2,264,702 | Latshaw | Dec. 2, 1941 |
| 2,434,287 | Pflager | Jan. 13, 1948 |